United States Patent [19]

Lagace et al.

[11] Patent Number: 5,186,050

[45] Date of Patent: Feb. 16, 1993

[54] MARINE SENSOR MOUNTING MECHANISM

[75] Inventors: Maurice P. Lagace, Peterborough; Stephen G. Boucher, Amherst; Robert M. Cullen, Hudson; Andrew L. Noyes, Bedford; John Willette, Wilton; Cynthia M. Russell, Bedford, all of N.H.

[73] Assignee: Airmar Technology Corporation, Milford, N.H.

[21] Appl. No.: 765,546

[22] Filed: Sep. 25, 1991

[51] Int. Cl.$^5$ .............................................. G01C 21/00
[52] U.S. Cl. .................................. 73/187; 73/861.92; 73/866.5
[58] Field of Search ................ 73/181, 182, 183, 185, 73/186, 187, 756, 861.62, 861.92, 863.85, 863.86, 866.5

[56] References Cited

U.S. PATENT DOCUMENTS

| 3,457,782 | 7/1969 | Maeder et al. | 73/187 |
| 3,754,441 | 8/1973 | Phillips | 73/187 |
| 3,930,413 | 1/1976 | Laird et al. | 73/863.85 |
| 4,096,754 | 6/1978 | Beveridge, Jr. et al. | 73/866.5 |
| 4,671,109 | 6/1987 | Halmi | 73/756 |
| 4,682,508 | 7/1987 | Steiner et al. | 73/866.5 |

Primary Examiner—Donald D. Woodiel
Attorney, Agent, or Firm—Hamilton, Brook, Smith & Reynolds

[57] ABSTRACT

A marine sensor mounting mechanism having a tubular sleeve in the hull of a boat; valve means mounted for pivotal movement in the sleeve from an open position when a sensor is in place to a closed position when the sensor is removed.

14 Claims, 6 Drawing Sheets

MARINE SENSOR MOUNTING MECHANISM

FIELD OF THE INVENTION

This invention relates in general to marine instruments for boats and, more particularly, to a through hull mounting mechanism for a marine sensor having a self-closing valve to prevent water from entering the boat when the sensor is removed from the mounting mechanism.

BACKGROUND OF THE INVENTION

Marine instruments such as depth finders, speed sensors, sonars and the like are mounted on boats, typically on the transom, so as to extend from the stern down into the water. Others are mounted forward of the boat's transom and project through the hull whereby the sensor portion of the sensor extends into the water forward of the transom.

In U.S. Pat. No. 4,898,029, there is disclosed a marine speed sensor of the paddle wheel type which projects through the hull of a boat with its paddle wheel outside the hull to be subjected to the flow of the water. The rotational speed of the paddle wheel is measured electronically to produce a visual readout indicating the boat's speed. The sensor mechanism, which, in this case, is the paddle wheel, projects from the hull and is connected by an electric cable to the readout dial which is frequently mounted on or near the instrument panel.

A generally flanged, tubular housing is permanently mounted in the hull of the boat and secured in place using a flanged nut. The sensor is inserted into the housing with its paddle wheel projecting outside of the hull and with the appropriate electric cable leading to the readout mechanism inside the hull. "O" rings on either or both of the housing or sensor, which is normally cylindrical, prevent the leakage of water into the boat when the sensor is in its operating position in its housing.

There are many times when it is desirable to remove the sensor from its housing as, for example, to remove growth such as barnacles from the surfaces exposed to sea water or to replace it with a blanking plug prior to haul-out, to prevent damage. Since the housing is permanently installed in the boat, in effect it is a hollow tube. When the sensor is removed, water will literally gush into the boat. For this purpose, a blanking plug having essentially the same configuration as the sensor is initially sold with the sensor to be inserted in the housing when the sensor is removed to stop the flow of water.

The technique of removing the sensor and replacing it with a blanking plug entails unscrewing a retaining nut, pulling the sensor from the housing, and pushing the blanking plug into place as quickly as possible. In this process, it is inevitable that water will enter the boat. With the housing located perhaps two to three feet below the waterline, a considerable "head" of water can cause a stream the diameter of the housing to rise a couple of feet into the boat even when an experienced, skillful person is removing the sensor and jamming the plug into place.

The present invention is directed toward remedying this situation.

SUMMARY OF THE INVENTION

The invention resides in the mechanism for removably mounting a marine sensor in the hull of a boat which comprises a tubular sleeve-like housing which is conformed interiorally to the shape of an sensor to be mounted, such that the sensor, which itself is generally tubular, can be inserted into and removed from the sleeve. The sleeve has an inboard and an outboard end with the inboard end exposed to the interior of the boat and the outboard end, thus, exposed to the water.

There are two main cylindrical chambers in the housing. The first chamber is of larger diameter than the second chamber and is located closer to the inboard end than is the second chamber. The chambers are joined by a tapering chamber which may be an inverted truncated cone or a smooth blend of general truncated configuration. When inserting the sensor or sleeve into the housing, it is passed through the first chamber and into the second chamber.

Valve means are mounted in the first chamber for pivotal movement from an open position when the sensor is in the sleeve to a closed position when the sensor is removed from the sleeve, the valve means automatically closing when the sensor is removed. The valve functions exactly the same way when the blanking plug is moved into position. The plug moves the valve to the open position and, when the plug is removed, the valve self closes.

In its broader sense, the valve means are arcuate with curvilinear exterior and interior surfaces. The valve means are hinged to an upper portion of the first chamber such that when the sensor is in the housing, the valve means are biased by the sensor to the open position with the exterior curved surface of the valve means hitting against the wall of the first chamber and the interior surface surrounding the sensor.

Specifically, in one embodiment the valve means comprises two vanes in the form of hollow half-cones, each vane is hinged to an upper portiion of the first chamber in inverted position, such that when the sensor is in the housing, the half-cones are biased by the sensor to the open position with their exterior surfaces adjacent the cylindrical wall of the first chamber and with their interior surfaces surrounding the sensor.

In another embodiment, the valve means comprises a single vane in the form of hollow elongated shell-like member, having a concave interior and a convex exterior. It is hinged to an upper portion of the first chamber. This embodiment functions like that of the first embodiment wherein the sensor or the blanking plug biases the valve member to the open position with its convex exterior urged toward the wall of the first chamber and with the convex interior surrounding the sensor or plug.

The valve is closed by the onrushing water. It is constructed such that any initial flow of water into the housing, upon either the sensor or plug being removed, biases the valve means to the closed position. To take advantage of the entering water flow, the two chambers are separated by a tapering chamber to create a laminar flow along and near the chamber wall, thus building up a pressure between the wall of the chamber and the exterior convex surface of the vane.

The closing of the valve may also be accomplished by a simple spring urging the cup-like member or half cones to the closed position, the spring pressure being sufficient to close the valve, but insufficient to overcome the force of the entering sensor or blanking plug.

As another feature of the invention, a camming surface may be formed on the tip of the single vane or the half cone vanes to create tapering voids between the vanes and the wall of the first cylindrical chamber, such that the water entering the housing will build up pressure on the surface(s) to initiate closing movement of the valve means.

The above and other features of the invention including various and novel details of construction and combinations of parts will now be more particularly described with reference to the accompanying drawings and pointed out in the claims. It will be understood that the particular marine sensor mounting mechanism embodying the invention is shown by way of illustration only and not as a limitation of the invention. The principles and features of this invention may be employed in varied and numerous embodiments without departing from the scope of the invention.

DETAILED DESCRIPTION OF THE INVENTION

Figure 1:
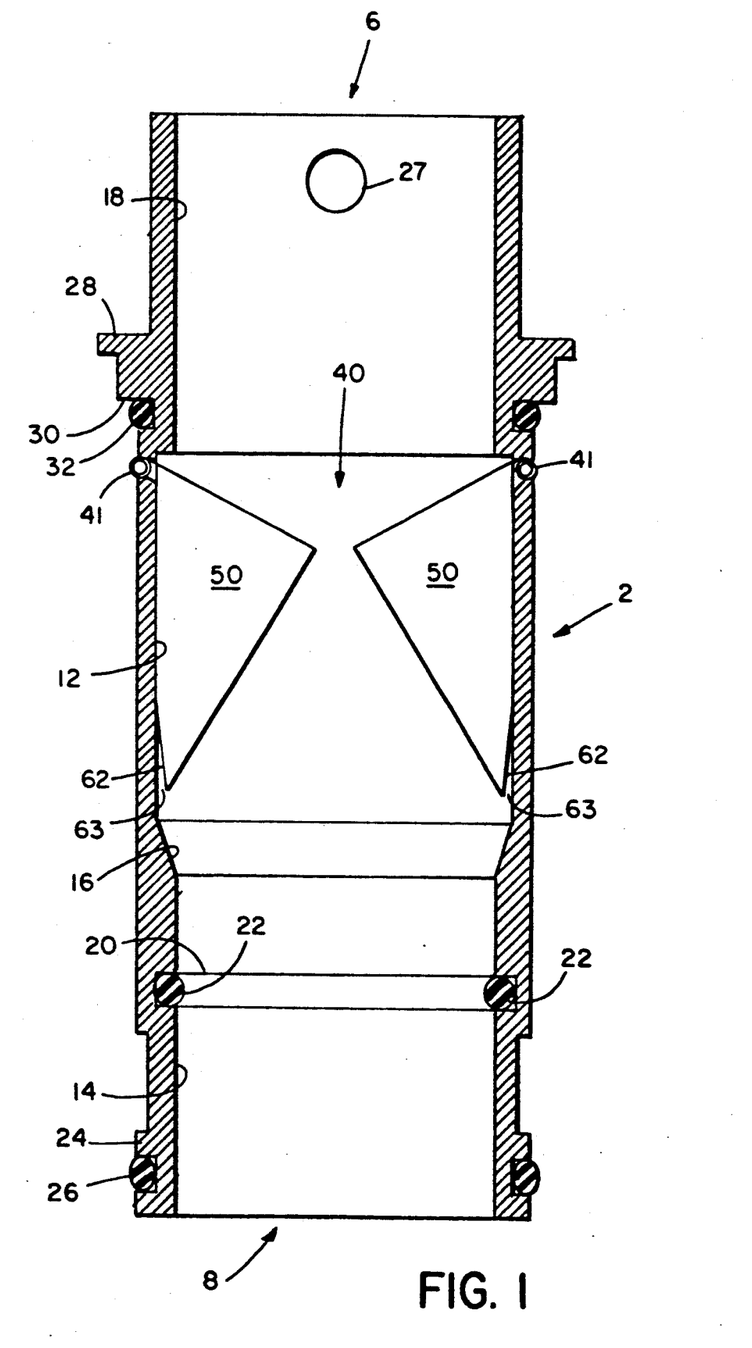
FIG. 1 is an enlarged sectional view of the shell of a mounting mechanism embodying the invention.
Figure 2:
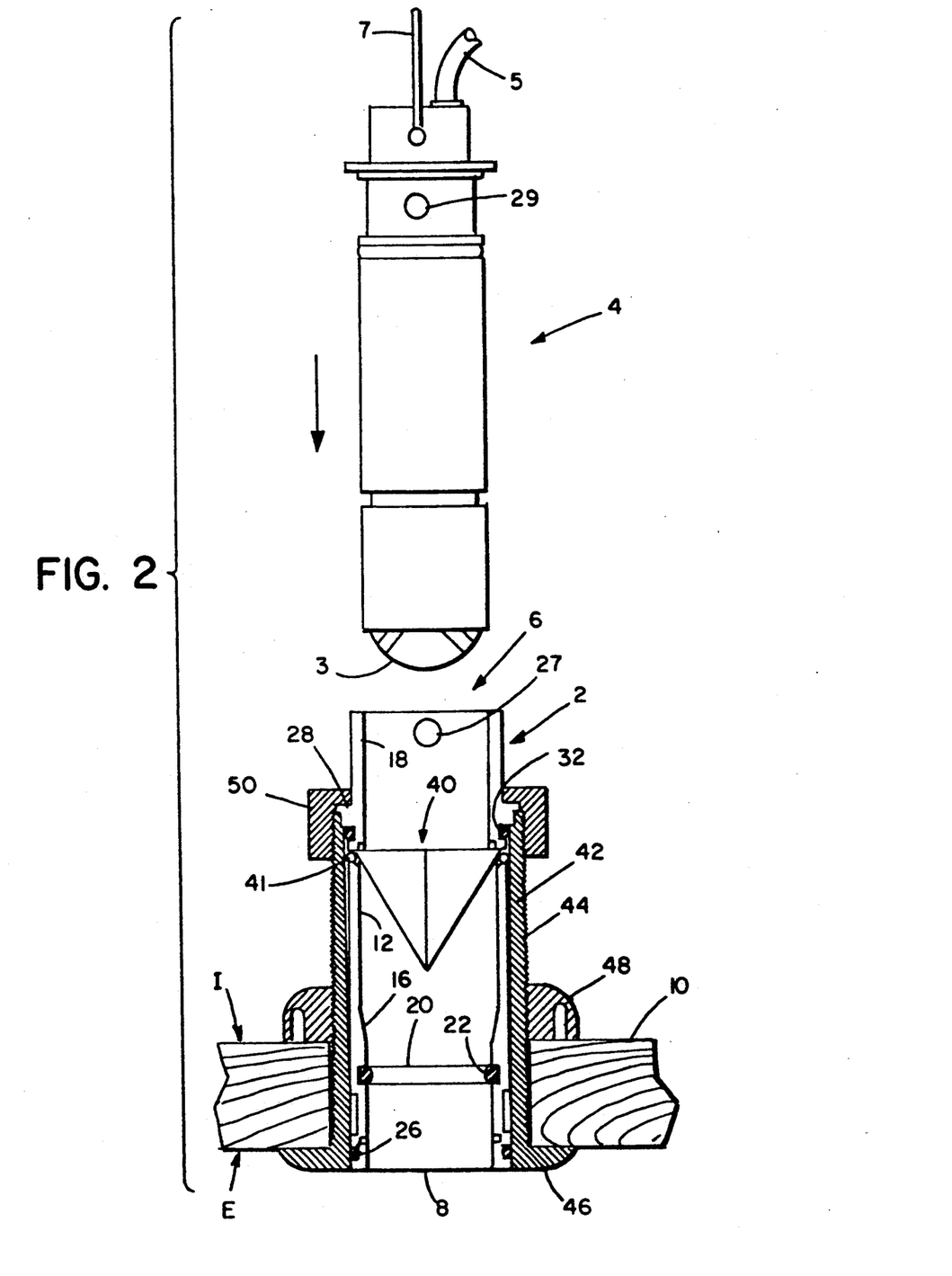
FIG. 2 is an exploded side elevation partly in section of a marine sensor and its mounting mechanism in the hull of a boat.

Referring initially to FIGS. 1 and 2, the invention will be seen embodied in a mechanism for removably mounting a marine sensor in the hull of a boat with automatic valve means to prevent the inflow of water when the sensor is withdrawn.

A tubular housing in the form of a sleeve or housing sleeve generally indicated 2 is conformed interiorally to the shape of an sensor 4 (FIG. 2) to be mounted in the boat. The sensor 4 is circular in cross section and can be inserted in and removed from the housing 2 to project its paddle wheel 3 outside of the hull. The housing sleeve 2 is of molded plastic and may be constructed of a plurality of parts such as half-sleeves joined together in conventional fashion. The housing has an inboard end 6 and an outboard end 8. When assembled in the hull of a boat 10 (FIG. 2), the inboard end is exposed to the interior I of a boat and the outboard end exposed to the exterior E.

There are two main cylindrical chambers in the sleeve 2 seen best in FIG. 1. The first chamber 12 is of larger diameter than the second chamber 14. The chambers 12 and 14 are separated by a tapering chamber 16 which may be an inverted truncated cone or a smooth blend of generally truncated conical configuration. An entry chamber 18 is located above the first main cylindrical chamber 12 and is the same diameter as the second chamber 14. Both are slightly larger than the outside diameter of the sensor 4.

An annular groove 20 is formed in the second or lower chamber for the reception of an O-ring 22. An exterior groove 24 is formed close to the outboard end 8 of the housing for receiving an O-ring 26. An exterior flange 28 is located around the entry chamber 18 and abuts a groove 30 for the reception of an O-ring 32.

Valve means, generally indicated 40, are located in the first chamber 12 and are mounted for pivotal movement at 41 near the top of the chamber 12 for movement from an open position as seen in FIG. 1 to a closed position as seen in FIG. 2. The valve means 40 will be described in greater detail hereinafter.

The means for positioning the housing sleeve 2 in the hull 10 of a boat will now be described with reference to FIG. 2. A tubular housing 42 having threads 44 on its exterior surface and a flange 46 at its lower end extends from the exterior E of the hull 10 into the interior I. A flanged nut 48 is threaded on to the housing 42 to clamp the housing in the hull with its lower flange 46 in engagement with the exterior surface of the boat. The sleeve 2 fits within the housing 42 with the O-ring 26 at the exterior end in engagement with the inner wall of the housing 42 and the O-ring 32 also engaged with the upper or inboard end of the housing 42. A hand nut 50 is threaded on to the inboard end of the housing 42 and engages the flange 48 to clamp the sleeve 2 firmly in place. It will be understood that the sleeve 2 and the housing 42 may be integrally joined or fabricated as one piece.

Figures 3A, 3B:
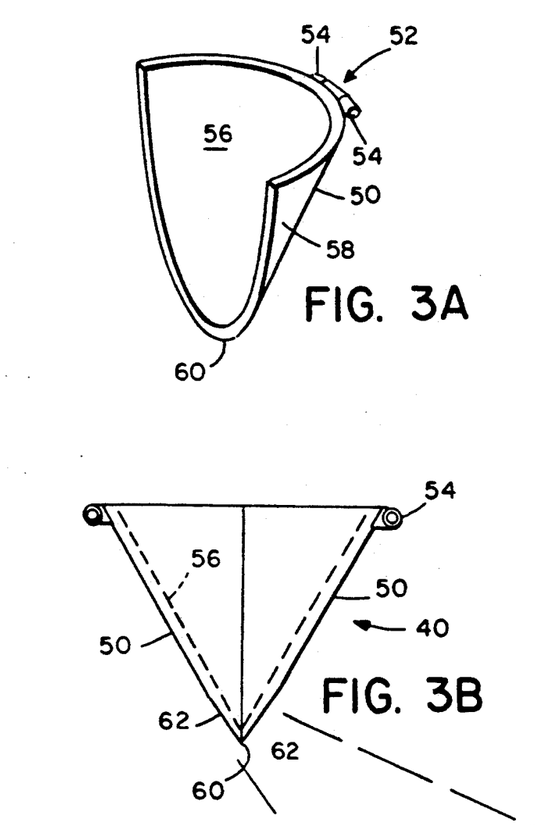
FIGS. 3A to 3E are detail views of one embodiment of a self-closing valve embodied in the invention.
Figure 3C:
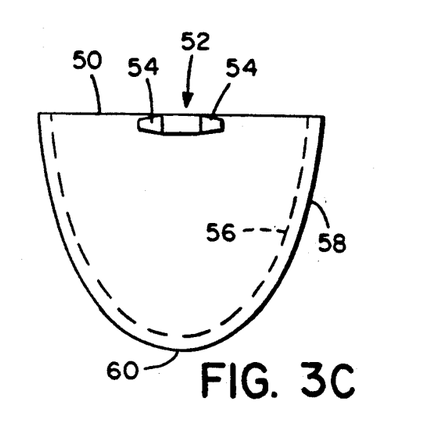
Figure 3D:
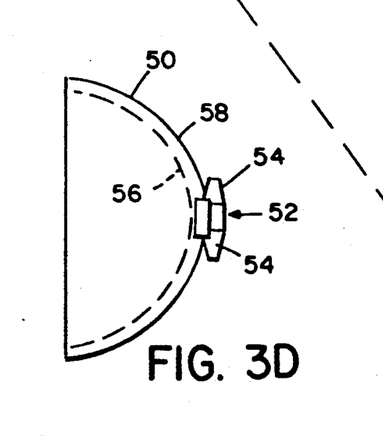
Figure 3E:
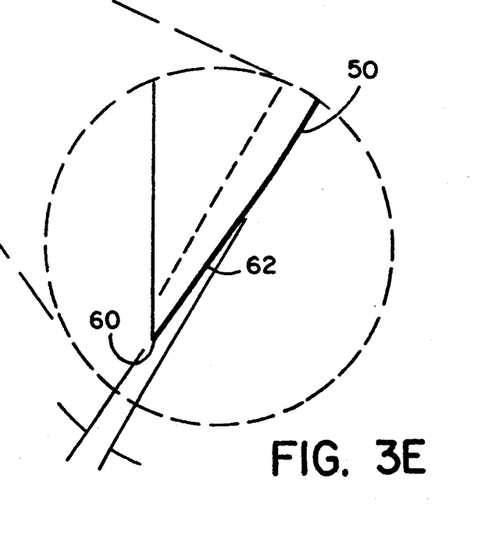

A preferred form of the valve means will be seen in FIGS. 3A through 3E. The valve means comprises two vanes 50 in the form of hollow half cones, each having a hinge portion 52 comprising a pair of projecting ears 54 which are received in the sleeve 2 at 41 (FIG. 1) at the upper portin the the first chamber 12. When so mounted, the vanes 50, when in the closed position, are in the form of an inverted hollow cone as seen in FIG. 3B. Both the interior surface 56 and exterior surface 58 of the vanes are curvilinear, the interior surface 56 being concave and the exterior surface 58 being convex. The lower or apex ends 60 of the vanes have a camming surface 62 in the form of an angled flat to create a tapering void between the vanes 50 and the wall of the upper cylinder 12, best seen in FIG. 1, when the vanes 50 are in the open position. The function of the camming surfaces will be described in greater detail hereinafter.

Figures 4A, 4B, 4C, 4D:
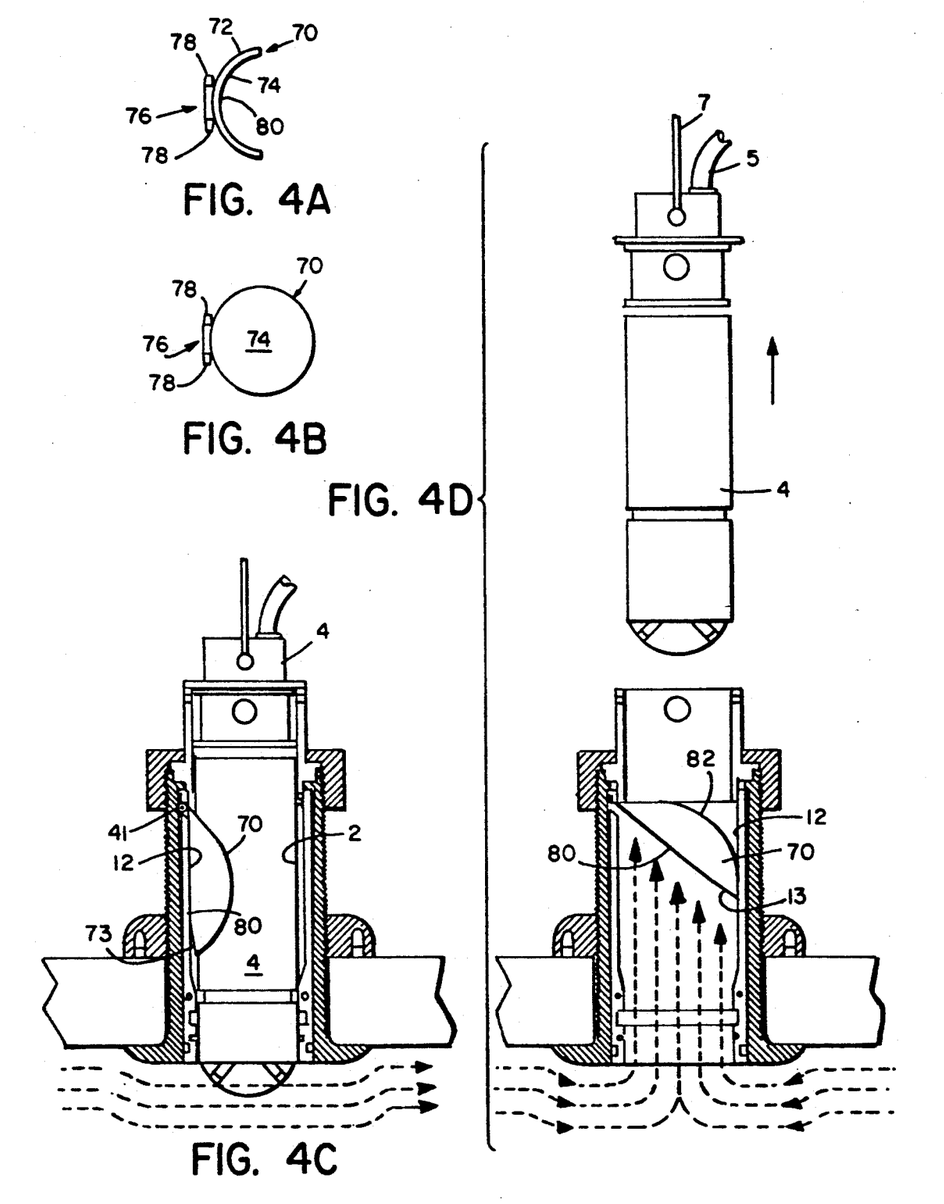
FIGS. 4A and 4B are detail views of another embodiment of the self-closing valve.
FIGS. 4C and 4D are views of the valve shown in FIGS. 4A and 4B in open and closed positions, respectively.

Another form of valve means will be seen in FIGS. 4A, 4B and 4C. The valve comprises a single vane 70, having curvilinear interior and exterior surfaces 72, 74, respectively. As with the split cone vane 40, the single vane 70 is provided with hinge means 76 having ears 78 which permit it to be hinged at the upper part 41 of the sleeve 2. As seen in FIG. 4C and 4D, the major axis 80 of the single vane valve means 70 is greater than the interior diameter of the upper chamber 12 of sleeve 2.

In operation, when the sensor 4 is inserted into the sleeve 2, the valve 70 is urged against the left hand wall of the sleeve with the major axis 80 pointing vertically downwardly as viewed in FIG. 4C and with the sensor 4 inside of the inner surface 74 of the valve. The exterior surface 72 of the valve engages the inner circular surface of the chamber 12 of the sleeve 2. Hence, when viewed from above, i.e., downwardly, along the central axis of the sleeve 2, the valve 70 appears as is shown in FIG. 4A, i.e., a semicircle.

When the sensor 4 is removed, the incoming water urges the valve to the FIG. 4D position with the peripheral edge 82 of the valve engaging the inner circumference of the chamber 12. Hence, the valve when viewed from above along the axis of the sleeve 2 is a circle as shown in FIG. 4B. The single vane valve 70 may also be provided with a camming surface 73 as is similar to the surface as 62 on the double vane valve shown in FIGS. 3A through 3E.

Figure 5A:
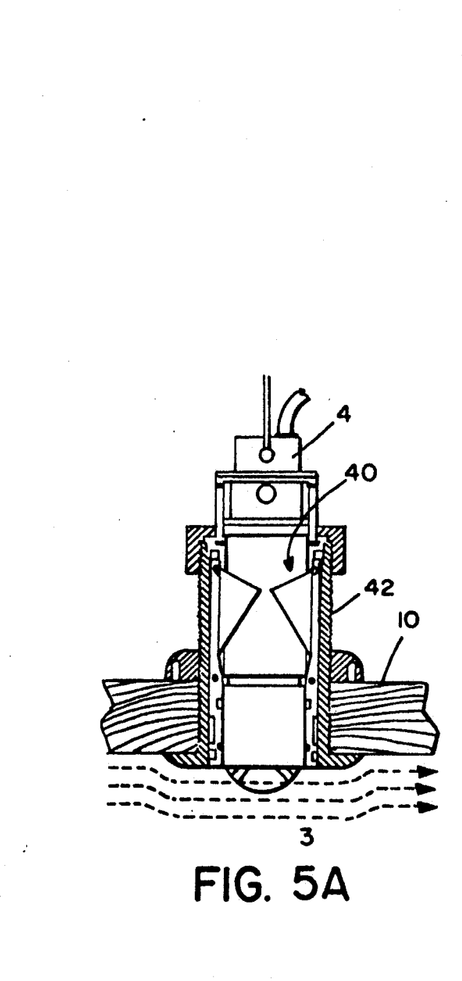
FIGS. 5A, 5B and 5C are detail views of the valve of FIGS. 3A to 3E in open, transitional and closed positions, respectively.
Figure 5B:
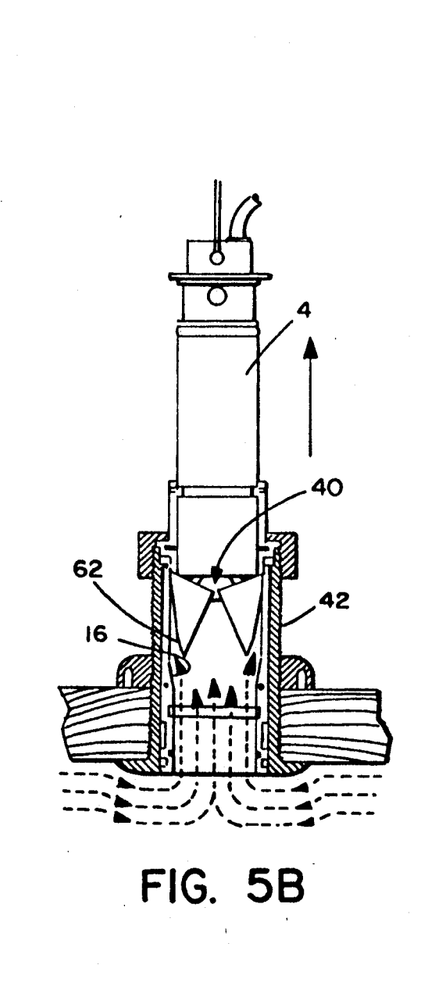
Figure 5C:
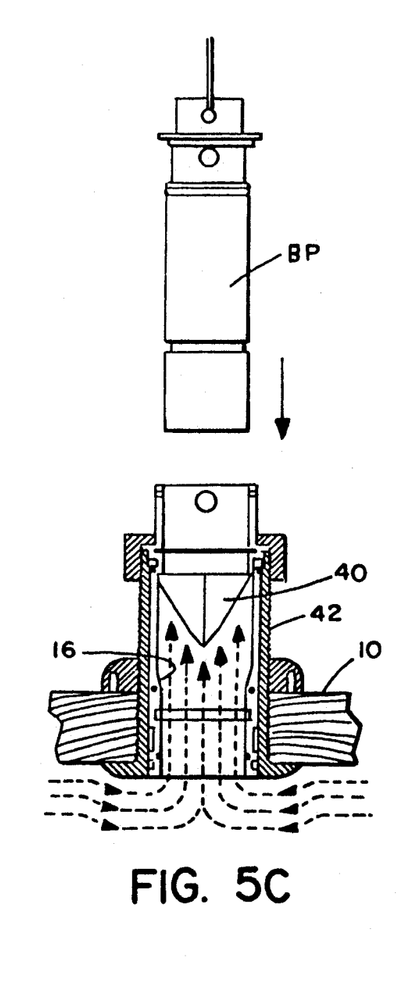

Both the double vane valve of FIGS. 3A through 3E and the single vane valve of FIGS. 4A through 4D operate in similar fashion. When the sensor 4 is removed from the sleeve, water rapidly enters the sleeve and the laminar flow at the blended truncated cylindrical portion 16 (FIG. 1) gets "behind" the camming surfaces 62 of the double vane valve or the camming surface 73 of the single vane valve creating a differential pressure thereby urging them upwardly as they pivot about their respective hinges, thus moving them from the open positions seen in FIG. 4C and 5A to the closed positions of FIGS. 4D through 5C. The blended surfaces induce and maintain laminar flow near the wall. Abrupt surfaces could "trip" the flow into the turbulent phase thereby rendering the operation of the closure mechanism uncertain. FIG. 5B shows the valve in a transitional period in the process of being closed by the incoming water.

Figure 6A:
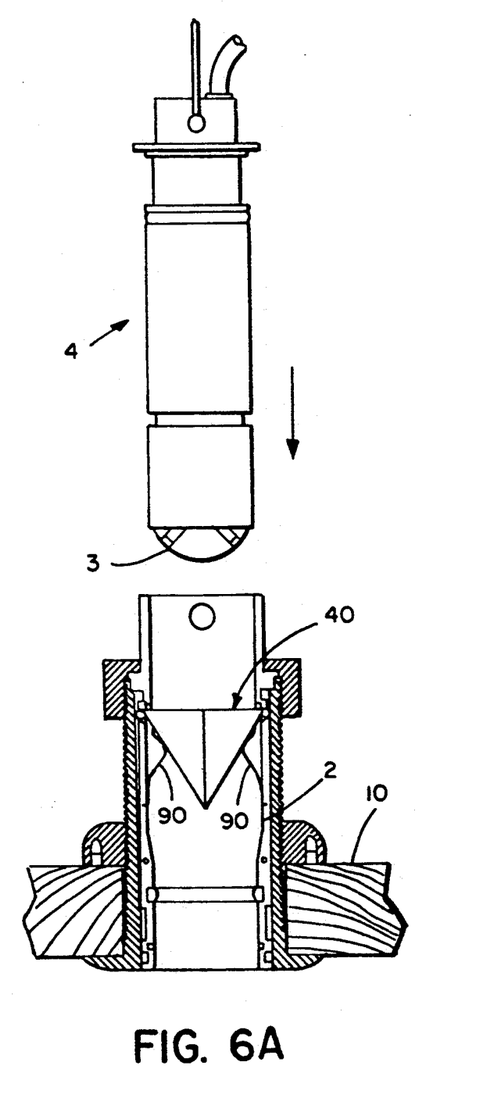
FIGS. 6A and 6B show both valves being biased closed by spring means.
Figure 6B:
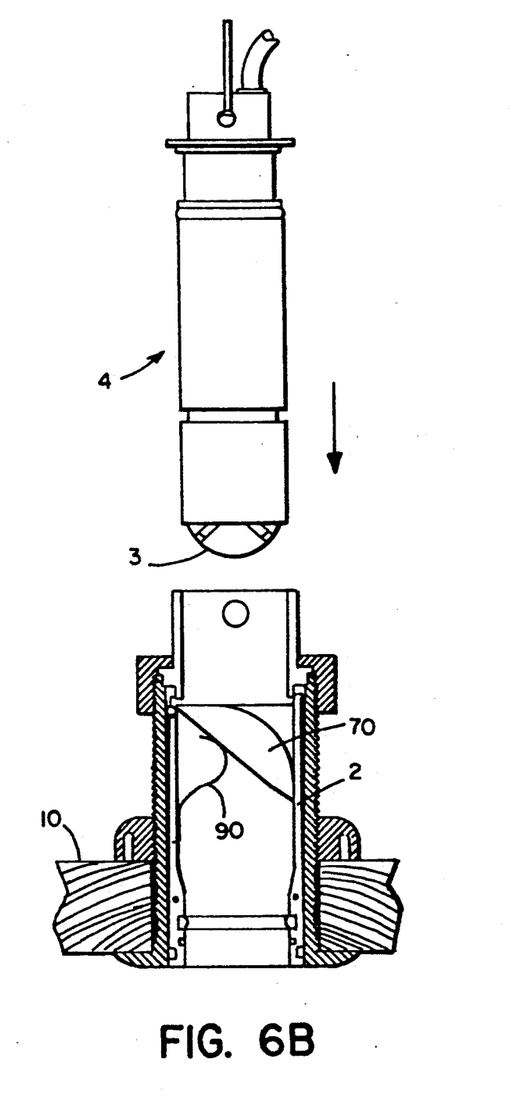

As seen in FIGS. 6A and 6B, rather than relying upon the flow of entering water to close the valves, this may be accomplished by spring means. As seen in FIG. 6A, a pair of leaf springs 90, each bearing upon one of the half cones urges the valve halves in to normally closed position. The insertion of either the sensor 4 or its blanking plug (BP) urges the half cones outwardly against the spring force where they remain until either the sensor 4 or the blanking plug (BP) replacement is removed. As seen in FIG. 6B, a single leaf spring 92, in like manner, normally urges the valve 90 into closed position. It is opened by either the insertion of the sensor 4 or its replacement blanking plug.

We claim:

1. Mechanism for removably mounting a marine sensor in the hull of a boat comprising:
    a tubular sleeve, the interior of which is conformed to the shape of a sensor to be mounted, the sleeve having an inboard end and an outboard end;
    means for positioning the sleeve in the hull of a boat with the inboard end exposed to the interior of the boat and the outboard end exposed to the exterior of the boat;
    first and second cylindrical chambers in the sleeve, the first cylindrical chamber being of larger diameter than the second cylindrical chamber and located closer to the inboard end than is the second cylindrical chamber;
    valve means in the first chamber mounted for pivotal movement upon contact with the sensor from an open position when the sensor is inserted in the housing to a closed position when the sensor is removed from the housing to prevent unwanted entry of water.

2. Mechanism according to claim 1 wherein the valve means is urged into closed position by spring means.

3. Mechanism according to claim 1 wherein the first and second cylindrical chambers are separated by a tapering chamber to create a laminar flow to close the valve means by water pressure as water enters the housing when the sensor is removed.

4. Mechanism for removably mounting a marine sensor in the hull of a boat comprising:
    a tubular sleeve, the interior of which is conformed to the shape of a sensor to be mounted, the sleeve having an inboard end and an outboard end;
    means for positioning the sleeve in the hull of a boat with the inboard end exposed to the interior of the boat and the outboard end exposed to the exterior of the boat;
    first and second cylindrical chambers in the sleeve, the first cylindrical chamber being of larger diameter than the second cylindrical chamber and located closer to the inboard end than is the second cylindrical chamber;
    arcuate valve means for closing the sleeve, said valve means having curvilinear exterior and interior surfaces hinged to an upper portion of the first chamber such that when the sensor is inserted in the housing, the valve means are biased by the sensor to an open position with the exterior surface adjacent the wall of the first chamber and the interior surface surrounding the sensor.

5. Mechanism according to claim 4 wherein the valve means is urged into closed position by spring means.

6. Mechanism according to claim 4 wherein the first and second cylindrical chambers are separated by a tapering chamber to create a laminar flow to close the valve means by water pressure as water enters the housing when the sensor is removed.

7. Mechanism for removably mounting a marine sensor in the hull of a boat comprising:
    a tubular sleeve, the interior of which is conformed to the shape of a sensor to be mounted, the sleeve having an inboard end and an outboard end;
    means for positioning the sleeve in the hull of a boat with the inboard end exposed to the interior of the boat and the outboard end exposed to the exterior of the boat;
    first and second cylindrical chambers in the sleeve, the first cylindrical chamber being of larger diameter than the second cylindrical chamber and located closer to the inboard end than is the second cylindrical chamber;
    valve means for closing the sleeve, said valve means comprising two vanes in the form of hollow half cones, each hinged to an upper portion of the first chamber in inverted position, such that when the sensor is inserted in the housing, the half cones are biased to an open position with their exterior surfaces adjacent the wall of the first chamber and the interior surfaces surrounding the sensor.

8. Mechanism according to claim 7 wherein the valve means is urged into closed position by spring means.

9. Mechanism according to claim 7 wherein the first and second cylindrical chambers are separated by a tapering chamber to create a laminar flow to close the valve means by water pressure as water enters the housing when the sensor is removed.

10. Mechanism according to claim 7 wherein there are camming surfaces formed on the vanes to create tapering voids between the vanes and the wall of the first cylindrical chamber, such that water entering the housing will bias the vanes to the closed position.

11. Mechanism for removably mounting a marine sensor in the hull of a boat comprising:
    a tubular sleeve, the interior of which is conformed to the shape of a sensor to be mounted and having an inboard end and an outboard end;
    means for positioning the housing in the hull of a boat with the inboard end exposed to the interior of the boat and the outboard end exposed to the exterior of the boat;

first and second cylindrical chambers in the sleeve, the first cylindrical chamber being of larger diameter than the second cylindrical chamber and located closer to the inboard end than is the second cylindrical chamber;

valve means for closing the sleeve, said valve means comprising a single vane in the form of a hollow, elongate cup-like member having a concave interior and a convex exterior hinged to an upper portion of the first chamber such that when the sensor is inserted in the housing, the valve member is biased to an open position with its exterior surface adjacent the wall of the first chamber and the interior surface surrounding the sensor.

12. Mechanism according to claim 11 wherein the valve means is urged into closed position by spring means.

13. Mechanism according to claim 11 wherein the first and second cylindrical chambers are separated by a tapering chamber to create a laminar flow to close the valve means by water pressure as water enters the housing when the sensor is removed.

14. Mechanism according to claim 11 wherein there is a camming surface formed on the vane to create a tapering void between the vane and the wall of the first cylindrical chamber, such that water entering the housing will bias the vane to the closed position.

* * * * *